(12) United States Patent
Wang et al.

(10) Patent No.: US 12,276,724 B1
(45) Date of Patent: Apr. 15, 2025

(54) METHOD FOR SUPPRESSING AZIMUTH AMBIGUITY OF MULTI-CHANNEL SAR SYSTEMS BASED ON CHANNEL CANCELLATION

(71) Applicant: Aerospace Information Research Institute, Chinese Academy of Sciences, Beijing (CN)

(72) Inventors: Yu Wang, Beijing (CN); JunFeng Li, Beijing (CN); YongHua Cai, Beijing (CN); Bo Li, Beijing (CN); PingPing Lu, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/961,160

(22) Filed: Nov. 26, 2024

(30) Foreign Application Priority Data

Apr. 19, 2024 (CN) .......................... 202410473718.6

(51) Int. Cl.
*G01S 13/90* (2006.01)
(52) U.S. Cl.
CPC ....... *G01S 13/9011* (2013.01); *G01S 13/9094* (2013.01)
(58) Field of Classification Search
CPC .......................... G01S 13/9011; G01S 13/9094
See application file for complete search history.

(56) References Cited

PUBLICATIONS

Cheng, Shuohan, et al. "A joint azimuth multichannel cancellation (JAMC) antibarrage jamming scheme for spaceborne SAR." IEEE Journal of Selected Topics in Applied Earth Observations and Remote Sensing 15 (2022): 9913-9926. (Year: 2022).*
Zhou, Yashi, et al. "A novel approach to Doppler centroid and channel errors estimation in azimuth multi-channel SAR." IEEE Transactions on Geoscience and Remote Sensing 57.11 (2019): 8430-8444. (Year: 2019).*

(Continued)

*Primary Examiner* — Peter M Bythrow
*Assistant Examiner* — Nazra Nur Waheed
(74) *Attorney, Agent, or Firm* — Seed IP Law Group LLP

(57) ABSTRACT

The present disclosure discloses a method for suppressing the azimuth ambiguity of multi-channel SAR systems based on channel cancellation, which falls within the field of radar signal processing. The method includes: imaging echoed of the multi-channel SAR system based on a linear mapping reconstruction algorithm to obtain a reconstructed high-resolution wide-swath image; estimating positions of the azimuth ambiguity regions of the reconstructed high-resolution wide-swath image; extracting ambiguity images in the azimuth ambiguity regions based on channel cancellation and the refocusing algorithm; and suppressing a repetitive ambiguity image in imaging the echo of the multi-channel SAR system. The method weakens the influence of the original image on azimuth ambiguity extraction, improves the performance of ambiguity suppression, and solves the problem of additional repetitive ambiguity in multi-channel SAR systems by reconstructing the ambiguity signal, and improves the image quality of the multi-channel SAR system, which has great value for subsequent applications such as SAR image interpretation.

4 Claims, 5 Drawing Sheets

(56) References Cited

PUBLICATIONS

Liu, Mingqian, et al. "Ambiguities Suppression for Azimuth Multichannel SAR Based on \${L\_{2, q}}\$ Regularization With Application to Gaofen-3 Ultra-Fine Stripmap Mode." IEEE Journal of Selected Topics in Applied Earth Observations and Remote Sensing 14 (2020): 1532-1544. (Year: 2020).*

* cited by examiner

METHOD FOR SUPPRESSING AZIMUTH AMBIGUITY OF MULTI-CHANNEL SAR SYSTEMS BASED ON CHANNEL CANCELLATION

TECHNICAL FIELD

The present disclosure belongs to the field of radar signal processing, and more particularly, to a method for suppressing azimuth ambiguity of multi-channel SAR systems based on channel cancellation.

RELATED ART

Synthetic aperture radar (SAR) is an important space remote sensing observation method. It can acquire multi-angle echo of the target scene on the carrier of airplanes or satellites, form a synthetic aperture in the azimuth, and realize two-dimensional imaging in combination with pulse compression operation in the range direction. It has the advantages of all-time and all-weather observation and important applications in terrain mapping and hazards monitoring. However, due to the contradiction between the observation width and the resolution, it is difficult for the traditional spaceborne SAR to guarantee a high-resolution observation and a wide observation swath simultaneously. Some scholars have proposed the azimuth multi-channel system, which expands the swath by reducing the sampling rate in azimuth. However, the low sampling rate will introduce in-band azimuth ambiguity. The multi-channel system solves the in-band azimuth ambiguity by multi-channel reconstruction.

However, the above-mentioned reconstruction scheme can only solve the in-band azimuth ambiguity, and the Doppler bandwidth of the actual received signal may be higher than that predicted by the radar system design due to the existence of sidelobes in the radar receiving antenna. In addition, scattering intensities of some special features at different angles are also slightly different, which is one of the reasons for out-band azimuth ambiguity. The traditional out-band azimuth ambiguity suppression can be roughly divided into two categories. One is based on the Wiener filter, which estimates the ratio of the out-band azimuth ambiguity and in-band signal energy on the basis of the expression of the antenna pattern. However, this kind of scheme only works well for ground objects uniform scattering characteristics. In addition, in the designation of the Wiener filter, the effect of the reconstruction operation in multiple channels on different frequency components is not considered, resulting in the inability to solve the problem of repetitive ambiguity. Another category of algorithms is based on refocusing, which uses the difference between ambiguity signal and image signal in range migration and azimuth compression filter to refocus the ambiguity on the basis of imaging results, while the image will be defocused. In this case, the pixels of ambiguity focused will be filtered out, and then transformed back to achieve azimuth ambiguity suppression. The drawback of this kind of algorithm is that the original image is greatly affected, and in the area where the original image is stronger, the defocused original image may still be stronger than the focused ambiguity image, which will bring certain interference to the detection and suppression of ambiguity pixels.

BRIEF SUMMARY

To solve the above-mentioned technical problem, the present disclosure provides a method for suppressing azimuth ambiguity of multi-channel SAR systems based on channel cancellation, which can eliminate the ambiguity caused by azimuth sidelobes of the antenna pattern in radar systems, and solve the repetitive ambiguity appearing in the multi-channel system. In addition, this technique can improve the quality of an imaging result, and provide guarantee for subsequent applications such as image interpretation.

To achieve the above-mentioned purpose, the present disclosure provides the following technical solutions:

A method for suppressing azimuth ambiguity of multi-channel SAR systems based on channel cancellation, comprising the following steps:
  step 1, focusing echoes of the multi-channel SAR system with the linear mapping reconstruction algorithm to obtain a reconstructed high-resolution wide-swath image;
  step 2, estimating positions of azimuth ambiguity region of the reconstructed multi-channel images;
  step 3, extracting images in the azimuth ambiguity region based on channel cancellation and the refocusing algorithm;
  step 4, suppressing the repetitive ambiguity image in echoes of the multi-channel SAR system.

Advantageous effects of the present disclosure are as follows:

The present disclosure achieves multi-channel azimuth ambiguity suppression through the refocusing algorithm, makes full use of the channel dimension provided by multi-channel systems to achieve channel cancellation, weakens the influence of the original image on azimuth ambiguity extraction, improves the performance of azimuth ambiguity suppression, and solves the problem of additional repetitive ambiguity in multi-channel SAR systems by reconstructing the azimuth ambiguity signals, and improves the image quality of the multi-channel SAR system, which has great value for subsequent applications such as SAR image interpretation.

DETAILED DESCRIPTION

In order that the objects, technical solutions and advantages of the present disclosure may be more clearly understood, the present disclosure will be described in further detail below in combination with the accompanying drawings and the embodiments. It should be understood that the particular embodiments described herein are illustrative only and are not restrictive. Furthermore, the technical features involved in the various embodiments of the present disclosure described below can be combined with each other as long as they do not conflict with each other.

Figure 1:
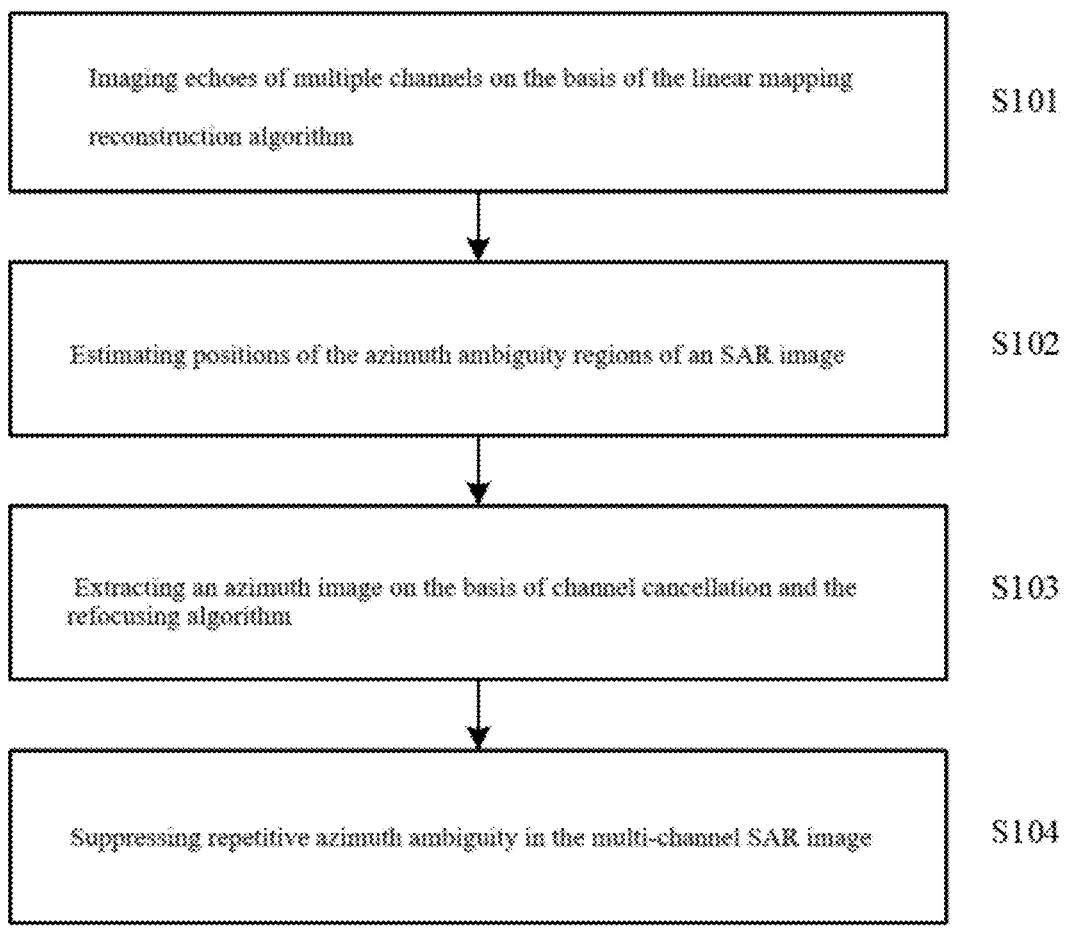
FIG. 1 is a flow chart of a method for suppressing azimuth ambiguity of multi-channel SAR systems based on channel cancellation according to the present disclosure.

According to an embodiment of the present disclosure, as shown in FIG. 1, a method for suppressing azimuth ambiguity of multi-channel SAR systems based on channel cancellation according to the present disclosure includes the following steps:

Step S101: the echoes of the multiple channels are imaged based on the linear mapping reconstruction algorithm, which includes:

it is assumed that the multi-channel SAR system is composed of N azimuth receiving channels, and the echo $s_n$ of the nh azimuth receiving channel and the echo ref with a high azimuth sampling rate satisfy the following relationship in the azimuth frequency domain:

$$S_n(\tau, f_\eta) = \sum_{i=0}^{N-1} S_{ref}(\tau, f'_\eta + if_a) H_n(f'_\eta + if_a)$$

wherein $\tau$ represents the range fast time, $f_\eta$ represents the azimuth frequency, $f_a$ represents the azimuth sampling rate of a single channel, and $$f_\eta \in \left[ f_c - \frac{f_a}{2}, f_c + \frac{f_a}{2} \right],$$

where $f_c$ represents the center frequency; in addition, here, for the convenience of representation, an intermediate variable $$f'_\eta \in \left[ f_c - \frac{Nf_a}{2}, f_c + \frac{Nf_a}{2} + f_a \right]$$

is introduced, and here $f'_\eta$ differs from $f_\eta$ by an integer multiple of $f_a$, $S_{ref}(\tau, f_n)$ represents the echo with a high azimuth sampling rate obtained after reconstruction, $H_n(f_n)$ represents a transfer function of the n th receiving channel, and n represents the serial number of the receiving channel, with a value range of 1, 2, . . . , N. i represents a serial number of a signal azimuth frequency spectrum component, which is determined according to an azimuth frequency interval, and the value range thereof is 0, 1, 2, . . . , N−1, which can be approximated as:

$$H_n(f_\eta) = \exp\left\{ -j\frac{\pi \Delta x_n^2}{2\lambda R_0} - j\frac{\pi f_\eta \Delta x_n}{V_s} \right\}, n = 1, 2, \ldots, N$$

wherein $R_0$ represents the nearest slant range, Vs represents the flight velocity of a platform, $\lambda$ represents the wavelength of the signal emitted by the radar system, $\Delta x_n$ represents the baseline of the nth channel relative to the reference channel, and j represents an imaginary unit.

Since the imaging processing is a linear operation, a reconstructed high-resolution wide-swath image I($\tau$,$\eta$) in the time domain can be split into n single-channel images $I_n(\tau,\eta)$ The echo of the nth channel is kept unchanged, and the rest channels are set to 0 for reconstruction and imaging, so that the time domain image $I_n(\tau,\eta)$ corresponding to the single channel can be obtained, wherein $\eta$ represents the azimuth slow time. Using the above-mentioned reconstruction and imaging operations for all channels, N images corresponding to the each single channel can be acquired, and the N images are superimposed to obtain a reconstructed high-resolution wide-swath image, namely:

$$I(\tau, \eta) = \sum_{n=1}^{N} I_n(\tau, \eta).$$

Step S102: the positions of the azimuth ambiguity regions of an SAR image is estimated which includes:

The obtained reconstructed high-resolution wide-swath image I($\tau$,$\eta$) is subjected to azimuth double-look, i.e. two multi-look images, namely, $L_1(\tau,\eta)$ and $L_2(\tau,\eta)$ are obtained by dividing the azimuth spectrum at the Doppler centroid and performing inverse Fourier transform respectively.

Since the frequency spectrum of the azimuth ambiguity has asymmetric characteristics, energy difference of the azimuth ambiguity in the two multi-look images will also be larger, and, on the contrary, the energy of images without the azimuth ambiguity in the two multi-look images is equivalent. Accordingly, the azimuth ambiguity detection function r($\tau$,$\eta$) can be defined as:

$$r(\tau,\eta) = \log\{(|L_1(\tau,\eta)|^2)/(|L_2(\tau,\eta)|^2)\}$$

Wherein log {·} represents the natural logarithm taking operation, (·) represents the spatial averaging operation, and |·| represents the absolute value calculation operation of a complex number.

Since the azimuth ambiguity has asymmetry, the absolute value of r($\tau$,$\eta$) of a ambiguity pixel is larger, and a decision factor d is used here to determine. The pixel of d>3 or d<−3 would be determined as a ambiguity pixel, and the decision factor is defined as follows:

$$d(\tau, \eta) = \frac{r(\tau, \eta) - \text{mean}\{r(\tau, \eta)\}}{std\{r(\tau, \eta)\}}$$

wherein mean {·} and std {·} represent the operation of taking the mean and the operation of taking the standard deviation, respectively.

Due to the difference of intensity of the ambiguity energy with respect to ground objects, the distribution of ambiguity pixels obtained by the above-mentioned operation is usually discrete. Herein morphological filtering is used to filter out wrong detection points of the discrete distribution, and relatively adjacent elements are fused to obtain a more complete ambiguity region.

Step S103: the ambiguity images are extracted on the basis of channel cancellation and the refocusing algorithm, which includes that:

both channel cancellation and refocusing are performed within the ambiguity region extracted in step S102. Firstly, the channel cancellation needs to be performed, the channel cancellation needs to ensure that the main image signal is suppressed, and the linear combination coefficient $\omega(f_\eta) = [\omega_1(f_\eta), \omega_2(f_\eta), \ldots, w_N(f_\eta)]$ for performing the channel cancellation should satisfy the following expression:

$$\begin{cases} \sum_{n=1}^{N} \omega_n(f_\eta) H_n(f_\eta + bf_a) = 0, b = 0, 1, \ldots, N-2 \\ \sum_{n=1}^{N} \omega_n(f_\eta) H_n(f_\eta + kf_a) = 1, k = -1 \end{cases}$$

wherein $\omega_n(f_\eta)$ represents the linear combination coefficient corresponding to the nth channel, n represents a serial number of the receiving channel, b represents a serial number of the Doppler interval, $$f_\eta \in \left[ f_c - \frac{Nf_a}{2}, f_c - \frac{(N-1)f_a}{2} \right],$$

and k represents an order of the azimuth ambiguity, a first group of formulas in the above-mentioned formula ensures the suppression of the original image energy, and the second group of formulas normalizes energy of a restored ambiguity signal. The above-mentioned set of formulas illustrates the design method of the linear combination coefficient for extracting out-band azimuth ambiguity energy in the low frequency band. For the extraction of the out-band azimuth ambiguity in the high frequency band, the calculation method of the linear combination coefficient is as follows:

$$\begin{cases} \sum_{n=1}^{N} \omega_n(f_\eta) H_n(f_\eta + bf_a) = 0, b = 0, -1, \ldots, -(N-2) \\ \sum_{n=1}^{N} \omega_n(f_\eta) H_n(f_\eta + kf_a) = 1, k = 1 \end{cases}$$

wherein $$f_\eta \in \left[ f_c + \frac{(N-1)f_a}{2}, f_c + \frac{Nf_a}{2} \right],$$

n represents the serial number of the receiving channel, b represents the serial number of the Doppler interval, and k represents the order of the azimuth ambiguity.

Since the reconstruction operation will add the linear coefficient $p_n(f_q)$ to the ambiguity spectrum, here $P_n(f_\eta)$ represents the reconstruction coefficient of the nth channel in the reconstruction process, and these additional linear coefficients need to be removed when performing channel cancellation. Using the multiple single-channel reconstruction imaging results obtained in step S101, it can be obtained that the form $I_{MCC}(\tau, f_\eta)$ of the image $I_{MCC}(\tau,\eta)$ in the time domain after cancellation in the range-Doppler domain is:

$$I_{MCC}(\tau, f_\eta) = \sum_{n=1}^{N} \frac{\omega_n(f_\eta)}{p_n(f_\eta)} I_n(\tau, f_\eta)$$

wherein $I_n(\tau, f_\eta)$ represents the form of the image $I_n(\tau,\eta)$ in the time domain corresponding to the nth channel in the range-Doppler domain.

Then, the ambiguity image needs to be extracted from the channel cancellation result. Since the proposed algorithm processes local azimuth ambiguity, it can be assumed that the imaging parameters do not change within the processing range. So the refocusing and inverse focusing of the ambiguity can be realized through phase multiplication in the two-dimensional frequency domain, and the specific calculation method of refocusing is:

$$R(\tau, \eta) = IFFT2\{r^{(1)}(f_\tau, f_\eta) \otimes K^*(f_\tau, f_\eta + k \cdot f_a)\}$$

$$r^{(1)}(f_\tau, f_\eta) = FFT2\{I_{MCC}(\tau, \eta)\} \otimes K(f_\tau, f_\eta)$$

$$K(f_\tau, f_\eta) = \exp\left\{ \frac{-4j\pi R_0}{c} \sqrt{(f_0 + f_\tau)^2 - \frac{c^2 f_\eta^2}{4V_r^2}} \right\}$$

wherein C represents the velocity of light, $V_\tau$ represents the equivalent imaging speed corresponding to the central range gate of the ambiguity region, $f_0$ represents the carrier frequency, $f_\tau$ represents the distance frequency, $r^{(1)}(f_\tau,f_\eta)$ represents the intermediate result, $R(\tau,\eta)$ represents the result of refocusing, represents the complex conjugate operation, $\otimes$ represents the Hadamard product, $K(f_\tau,f_\eta)$ represents the two-dimensional frequency domain expression of an echo of an ideal point target, $FFT2\{\cdot\}$ represents the two-dimensional Fourier transform, $IFFT2\{\cdot\}$ represents the two-dimensional inverse Fourier transform, and $k=\pm 1$ represents the ambiguity order which is consistent with the ambiguity order k used for calculating the channel coefficient in the preceding text. Refocusing the ambiguity of different orders only needs to modify k to the corresponding values.

In a refocused image, it is necessary to further screen out the pixels corresponding to the ambiguity, and a mixed Gaussian model is used to distinguish the ambiguity pixels from residual original image pixels, wherein the mixed Gaussian model assumes that these two pixels respectively follow two Gaussian distributions, $N(\mu_1, \Sigma_1)$ and $N(\mu_2, \Sigma_2)$ respectively represent the distributions to which the ambiguity and the original image pixels follow, wherein $\mu$ and $\Sigma$ respectively represent the mean value and the covariance matrix of a Gaussian variable, and subscripts are used to distinguish different components. 1 represents ambiguity pixels, and 2 represents image pixels. After image cancellation and refocusing, the energy of the remaining original image pixels is relatively low, and the class with larger energy is classified as ambiguity, i.e. where $trace(\Sigma_1) > trace(\Sigma_2)$ $trace(\cdot)$ represents the trace operation of the matrix.

An image $R_{Amb}(\tau,\eta)$ corresponding to ambiguity pixels is obtained from a refocused image through classification of a mixed Gaussian ambiguity, and inverse refocusing needs to be performed here to obtain a ambiguity image $I_{Amb}(\tau,\eta)$ corresponding to the ambiguity pixels, and the specific calculation method is as follows:

$$I_{Amb}(\tau,\eta) = IFFT2\{r^{(2)}(f_\tau,f_\eta) \otimes K^*(f_\tau,f_\eta)\}$$

$$r^{(2)}(f_\tau,f_\eta) = FFT2\{R_{Amb}(\tau,\eta)\} \otimes K(f_\tau,f_\eta + kf_a)$$

wherein $r^{(2)}$ represents an intermediate result, the above-mentioned operations need to be respectively performed on the ambiguities of a positive order and a negative order, and the obtained results are respectively denoted as $I_{Amb}^h$ and $I_{Amb}^l$.

Step S104: repetitive azimuth ambiguity is suppressed in the multi-channel SAR image, which includes:

combining the ambiguity images of different orders obtained in Step 103 to obtain ambiguity images $I_n^{Amb}(\tau, f_\eta)$ corresponding to N channels respectively, and the specific calculation method is as follows:

$$I_n^{Amb}(\tau,f_\eta) = I_{Amb}^l(\tau,f_\eta) \cdot H_n(f_\eta - f_a) + I_{Amb}^h(\tau,f_\eta) \cdot H_n(f_\eta + Nf_a)$$

through the inverse imaging algorithm, the ambiguity images $I_n^{Amb}(\tau,\eta)$ corresponding to N channels respectively can be transformed into the ambiguity echoes $S_n^{Amb}(\tau,\eta)$ corresponding to N channels respectively. Furthermore, by performing multi-channel reconstruction and imaging operations on the ambiguity echoes corresponding to the N channels respectively, a complete ambiguity image $I_{Amb}^{All}$ containing the repetitive ambiguity can be obtained, and by subtracting the ambiguity image $I_{Amb}^{All}$ from an original high-resolution wide-swath image $I(\tau,\eta)$, an image after ambiguity suppression can be obtained.

Embodiment 1

Embodiment 1 adopts measured data of LT-1 spaceborne SAR for ambiguity suppression and the system parameters are shown in Table 1.

TABLE 1

| Parameters | Value |
| --- | --- |
| Track height | 607.00 km |
| Carrier frequency | 1.26 GHz |
| Bandwidth | 80 MHZ |
| PRF of a single channel | 2215.00 Hz |
| Look angle | 29.64° |
| Polarization mode | HH |
| Number of azimuth channels | 2 |

Figure 2:
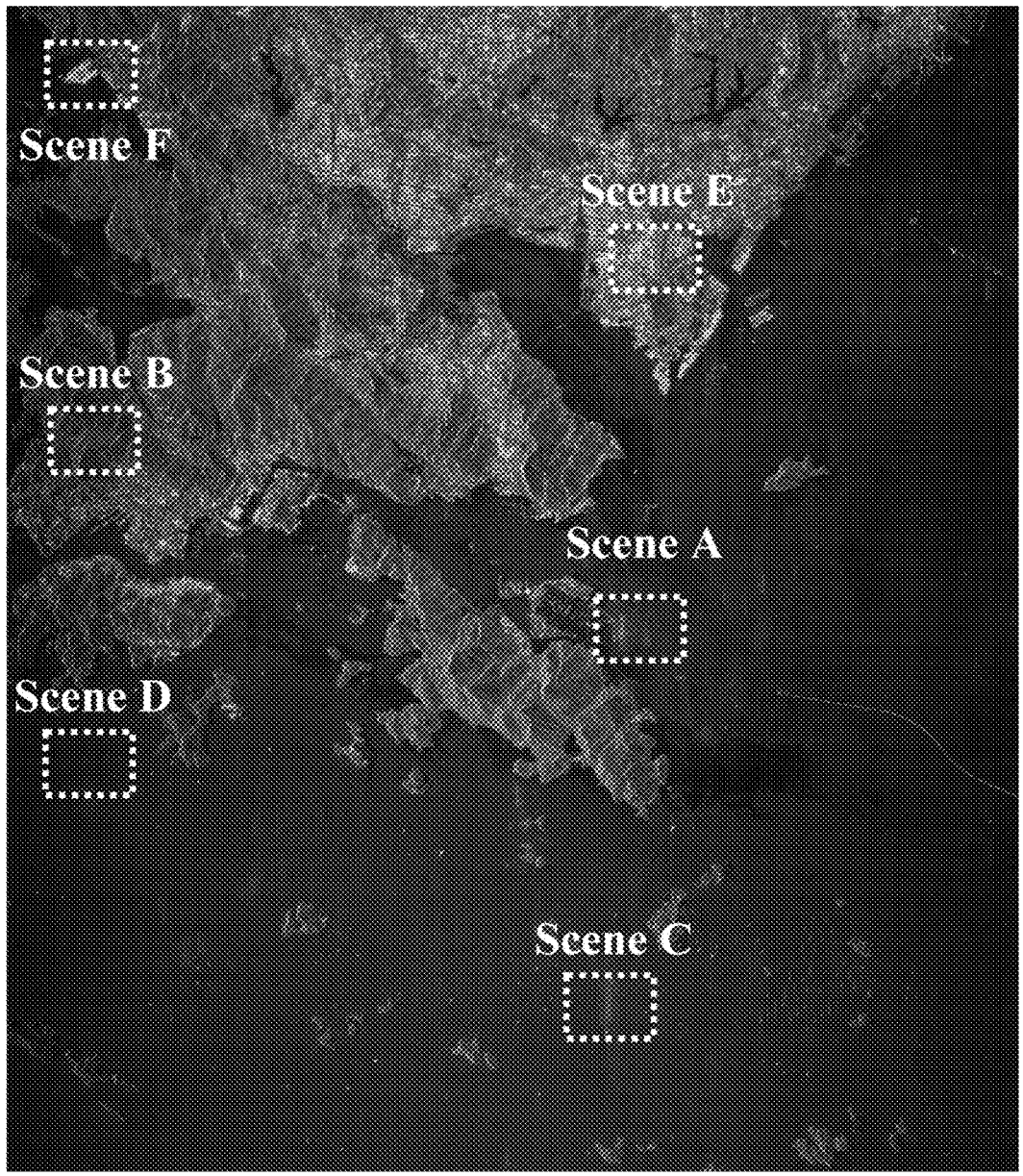
FIG. 2 is a schematic diagram of an image containing azimuth ambiguity pixels according to an embodiment of the present disclosure.
Figure 3:
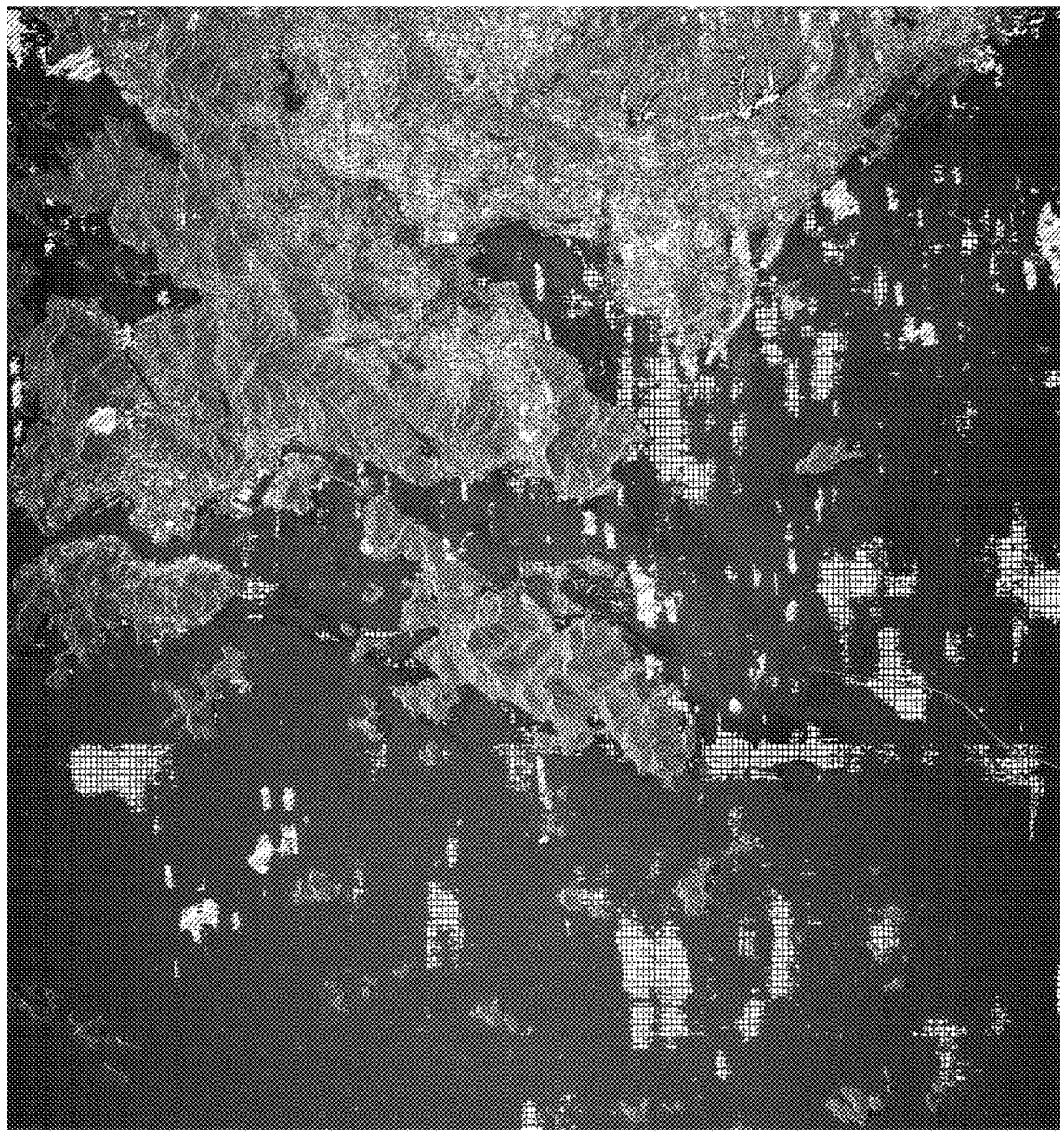
FIG. 3 is a schematic diagram of a result of positioning the azimuth ambiguity pixels according to an embodiment of the present disclosure.
Figure 4:
FIG. 4 is a schematic diagram of a result after suppressing the azimuth ambiguity according to an embodiment of the present disclosure.

FIG. 2 illustrates the result of the original inclusion of the azimuth ambiguity, wherein six scenarios A-F are marked, wherein scenario A represents a −1st order ambiguity, scenario C comprises a repetitive ambiguity corresponding to the ambiguity in scenario A, scenario E is a source image of the ambiguity in scenario A, scenario B is also a −1st order ambiguity, scenario D comprises a repetitive ambiguity corresponding to the ambiguity in scenario B, and scenario F is a source image of the ambiguity in scenario B. FIG. 3 shows the result of azimuth ambiguity positioning, wherein an ambiguity region of d>3 is represented in a hatched area in a diagonal line shape in the figure, which corresponds to a −1 order ambiguity, and a region of d<−3 is represented by a hatched area in a square grid shape, which represents a repetitive ambiguity corresponding to the −1 order ambiguity. FIG. 4 shows the results of the method for suppressing azimuth ambiguity of a multi-channel SAR system based on channel cancellation proposed in the present disclosure, and the effectiveness of the proposed method for ambiguity suppression can be seen by comparing FIG. 3 and FIG. 4.

Figure 5:
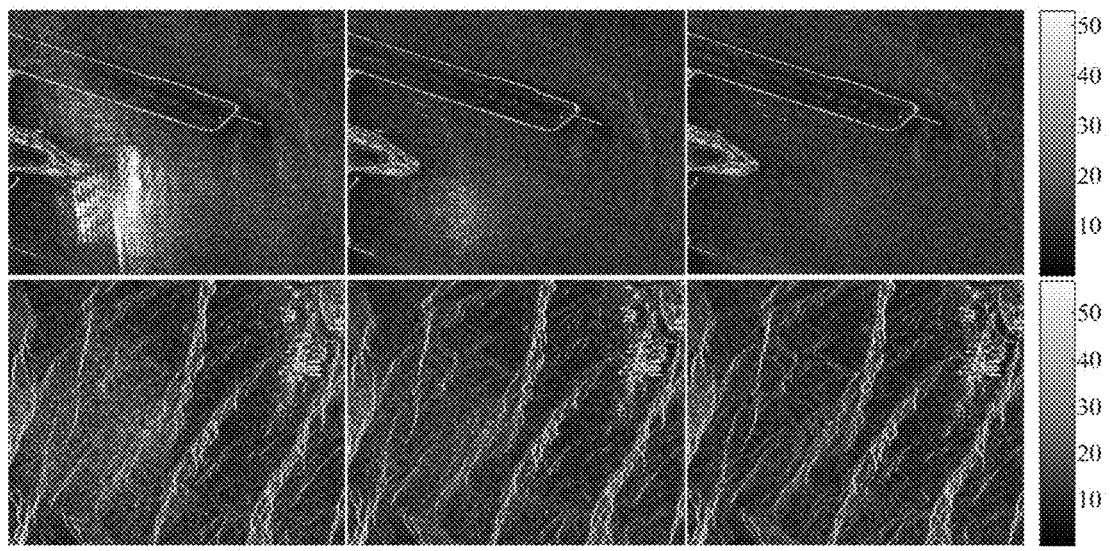
FIG. 5 is a schematic diagram of results after suppressing the azimuth ambiguity with different methods.
Figure 6:
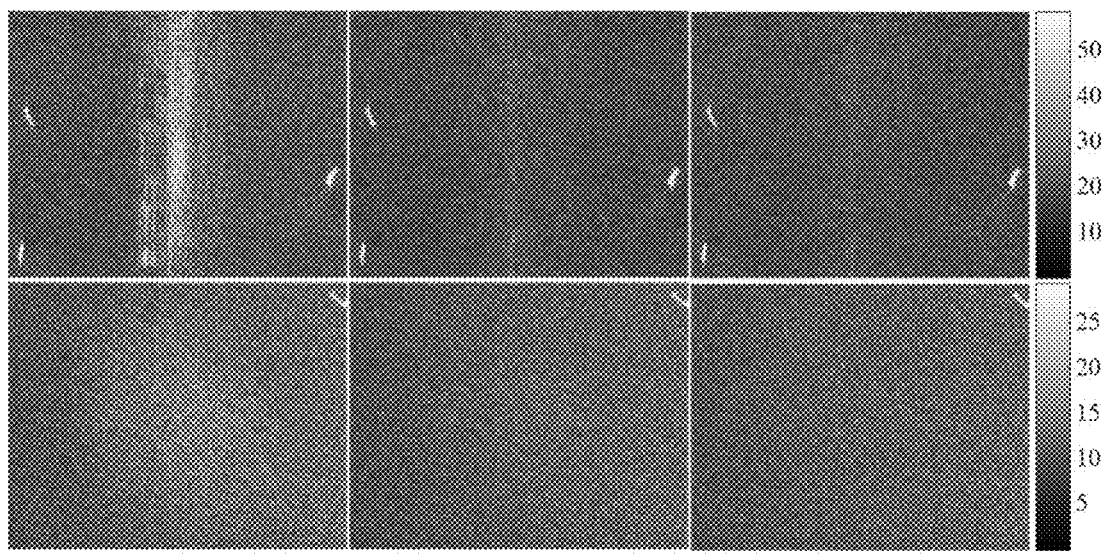
FIG. 6 is a schematic diagram of the effects of different algorithms on the suppression of repetitive ambiguities occurring in multiple channels.

In order to compare the advantages of the proposed method of the present disclosure and the conventional refocusing ambiguity suppression algorithm for a single channel, the marked ambiguity-containing scenario in FIG. 2 is enlarged, analyzed and compared. FIG. 5 illustrates the processing results of scenario A and scenario B, wherein the first row corresponds to the original image of the scenario A, the processing result of the conventional single-channel refocusing algorithm for the scenario A, and the processing result of the proposed method of the present disclosure for the scenario A, respectively; the second row corresponds to the original image of the scenario B, the processing result of the conventional single-channel refocusing algorithm for the scenario B, and the processing result of the proposed method of the present disclosure for the scenario B, respectively; it can be seen from the comparison of the results of the second column and the third column that the traditional single-channel refocusing is affected by the original image, the performance of ambiguity suppression is crossed, and the phenomenon of ambiguity residue is more serious;

FIG. 6 shows the processing results of scenario C and scenario D, and shows that the arrangement of the results is the same as that in FIG. 5. Since this figure shows that the repetitive ambiguity signal is relatively weak, and the improvement of the proposed algorithm introduced in the visual effect is not greater than that in scenarios A and B, in order to quantitatively compare the processing results, image entropy is used to measure the processing effect. Table 2 shows results of image entropy after different algorithms. Since the ambiguity will introduce additional information, resulting in an increase in the image entropy, the lower the image entropy, the better the suppression effect, and the proposed algorithm has a greater advantage from a numerical point of view, and can improve the performance of the multi-channel SAR system.

TABLE 2

| Image entropy | Scenario A | Scenario B | Scenario C | Scenario D |
| --- | --- | --- | --- | --- |
| Original image | 1.7698 | 3.8532 | 2.8431 | 4.4418 |
| Conventional refocusing | 1.4443 | 3.7803 | 2.5876 | 4.3135 |
| Proposed algorithm | 1.4362 | 3.7650 | 2.5607 | 4.3070 |

The specific embodiments described above provide further detailed explanations of the objectives, technical solutions, and beneficial effects of the present disclosure. It should be understood that, the foregoing description is merely detailed embodiments of the present disclosure, and is not intended to limit the present disclosure. Any modifications, equivalents, improvements, etc. within the spirit and principles of the present disclosure are intended to be included within the scope of protection of the present disclosure.

The invention claimed is:

1. A method for suppressing azimuth ambiguity of multi-channel SAR systems based on channel cancellation, characterized by comprising the following steps:
   step 1, imaging echoes of the multi-channel SAR system based on a linear mapping reconstruction algorithm to obtain a reconstructed high-resolution wide-swath image;
   step 2, estimating positions of the azimuth ambiguity regions of the reconstructed high-resolution wide-swath image and defining an azimuth ambiguity detection function $r(\tau,\eta)$ as:

$$r(\tau,\eta)=\log\{\{|L_1(\tau,\eta)|^2\}/\{|L_2(\tau,\eta)|\}\}$$

wherein log $\{\cdot\}$ represents a natural logarithm operation, represents a spatial averaging operation, $|\cdot|$ represents an absolute value calculation operation of a complex number, and $L_1(\tau,\eta)$ and $L_2(\tau,\eta)$ respectively represent two multi-look images obtained by performing azimuth double-look on a reconstructed high-resolution wide-swath image, $\tau$ represents a range fast time and $\eta$ represents an azimuth slow time;
   step 3, extracting ambiguity images in the azimuth ambiguity regions based on channel cancellation and a refocusing algorithm, wherein a linear combination coefficient $\omega(f_\eta)=[\omega_1(f_\eta), \omega_2(f_\eta), \ldots, \omega_N(f_\eta)]$ for the-channel cancellation satisfies the following expression:

$$\begin{cases} \sum_{n=1}^{N} \omega_n(f_\eta) H_n(f_\eta + bf_a) = 0, b = 0, 1, \ldots, N-2 \\ \sum_{n=1}^{N} \omega_n(f_\eta) H_n(f_\eta + kf_a) = 1, k = -1 \end{cases}$$

wherein $\omega_n(f_\eta)$ represents the linear combination coefficient corresponding to the nth channel, n represents a serial number of a receiving channel, b represents a serial number of a Doppler interval, an azimuth frequency is $$f_\eta \in \left[ f_c - \frac{Nf_a}{2}, f_c - \frac{(N-1)f_a}{2} \right],$$

$f_a$ represents an azimuth sampling rate of a single channel, $f_c$ represents a center frequency, $H_n(f_\eta)$ represents a transfer function of the nth receiving channel, and k represents an order of an azimuth ambiguity;

a form $I_{MCC}(\tau,f_\eta)$ of a image $I_{MCC}(\tau,\eta)$ in the time domain after channel cancellation in a range-Doppler domain is:

$$I_{MCC}(\tau, f_\eta) = \sum_{n=1}^{N} \frac{\omega_n(f_\eta)}{p_n(f_\eta)} I_n(\tau, f_\eta)$$

wherein $p_n(f_\eta)$ represents a reconstruction coefficient of the nth channel in a reconstruction process, and $I_n(\tau,f_\eta)$ represents a form of an image $I_n(\tau,\eta)$ in the time domain corresponding to the nth channel in the range-Doppler domain;

ambiguity refocusing and inverse defocusing are realized by phase multiplication in two-dimensional frequency domain, and a calculation method of refocusing is:

$$R(\tau, \eta) = IFFT2\{r^{(1)}(f_\tau, f_\eta) \otimes K^*(f_\tau, f_\eta + k \cdot f_a)\}$$

$$r^{(1)}(f_\tau, f_\eta) = FFT2\{I_{MCC}(\tau, \eta)\} \otimes K(f_\tau, f_\eta)$$

$$K(f_\tau, f_\eta) = \exp\left\{ \frac{-4j\pi R_0}{c} \sqrt{(f_0 + f_\tau)^2 - \frac{c^2 f_\eta^2}{4V_r^2}} \right\}$$

wherein c represents the velocity of light, $V_\tau$ represents an equivalent imaging speed corresponding to the central range gate of the ambiguity region, $f_0$ represents a carrier frequency, $R_0$ represents a nearest slant range, $f_\tau$ represents a distance frequency, $r^{(1)}(f_\tau,f_\eta)$ represents an intermediate result, $R(\tau,\eta)$ represents a result of refocusing, * represents a complex conjugate operation, $\otimes$ represents a Hadamard product, $K(f_\tau,f_\eta)$ represents a two-dimensional frequency domain expression of an echo of an ideal point target, FFT2{·} represents a two-dimensional Fourier transform, and IFFT2{·} represents a two-dimensional inverse Fourier transform; and an image $R_{Amb}(\tau,\eta)$ corresponding to ambiguity pixels is obtained from a refocused image through classification of a mixed Gaussian ambiguity, and inverse refocusing is performed to obtain a ambiguity image $I_{Amb}(\tau,\eta)$ corresponding to the ambiguity pixels:

$$I_{Amb}(\tau,\eta) = IFFT2\{r^{(2)}(f_\tau,f_\eta) \otimes K^*(f_\tau,f_\eta)\}$$

$$r^{(2)}(f_\tau,f_\eta) = FT2\{R_{Amb}(\tau,\eta)\} \otimes K(f_\tau,f_\eta + kf_a)$$

wherein $r^{(2)}$ represents an intermediate result; and step 4, suppressing a repetitive blurred image in an echo of the echoes of the multi-channel SAR system.

2. The method for suppressing azimuth ambiguity of multi-channel SAR systems based on channel cancellation according to claim 1, characterized in that the step 1 comprises:

extending spectrum of echo data of each channel of the multi-channel SAR system to zero-padding in time domain, obtaining a single channel imaging result of each channel by a reconstruction filter and an imaging algorithm, and superimposing the single channel imaging results of all channels to obtain the reconstructed high-resolution wide-swath image.

3. The method for suppressing azimuth ambiguity of multi-channel SAR systems based on channel cancellation according to claim 1, characterized in that the step 2 comprises:

on the basis of spectral asymmetry of the azimuth ambiguity, calculating pixels that containing the azimuth ambiguity in the reconstructed high-resolution wide-swath image, processing pixels that containing the azimuth ambiguity by using morphological filtering, then dividing the pixels into a plurality of communicative regions, and estimating the position of the azimuth ambiguity region.

4. The method for suppressing azimuth ambiguity of multi-channel SAR systems based on channel cancellation according to claim 1, characterized in that the step 4 comprises:

transforming an ambiguity image of the extracted ambiguity images into an azimuth frequency domain, recovering components of ambiguity energy corresponding to the ambiguity image in each channel, performing inverse imaging on the components of the ambiguity energy corresponding to the ambiguity image in each channel to obtain a ambiguity echo signal, performing reconstruction and the imaging algorithm on the ambiguity echo signals of multiple channels to obtain a complete ambiguity image containing a repetitive ambiguity, and subtracting the ambiguity image containing the repetitive ambiguity from the reconstructed high-resolution wide-swath image to obtain an image after ambiguity suppression.

\* \* \* \* \*